(12) United States Patent
Mitsui

(10) Patent No.: US 10,310,788 B2
(45) Date of Patent: Jun. 4, 2019

(54) CONTROL METHOD FOR GENERATING DATA USED FOR PRINTING AND INFORMATION PROCESSING APPARATUS

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/688,618

(22) Filed: Aug. 28, 2017

(65) Prior Publication Data
US 2018/0060003 A1    Mar. 1, 2018

(30) Foreign Application Priority Data
Aug. 30, 2016  (JP) .................................. 2016-167778

(51) Int. Cl.
*G06F 3/12* (2006.01)

(52) U.S. Cl.
CPC .......... *G06F 3/1254* (2013.01); *G06F 3/1204* (2013.01); *G06F 3/1205* (2013.01); *G06F 3/1241* (2013.01)

(58) Field of Classification Search
CPC .... G06F 3/1254; G06F 3/1236; G06F 3/1268; G06F 3/1286; G06F 3/1203; G06F 3/1204; G06F 3/1241; G06F 3/1205; H04N 1/00244; H04N 1/00795; G06K 15/1805; G06K 15/1809; G06K 15/1813; G06K 15/1857
USPC ................................................ 358/1.1–1.18
See application file for complete search history.

(56) References Cited

U.S. PATENT DOCUMENTS

| | | | | |
|---|---|---|---|---|
| 2007/0013931 A1* | 1/2007 | Ito | ......................... | G06F 3/1205 358/1.13 |
| 2010/0306646 A1* | 12/2010 | Fukase | .................. | G06F 3/1208 715/274 |
| 2011/0199648 A1* | 8/2011 | Sakuraba | .............. | G06F 3/1205 358/1.18 |
| 2012/0268792 A1* | 10/2012 | Ozaki | ................... | G06F 17/217 358/1.18 |
| 2018/0136889 A1* | 5/2018 | Ward | .................... | G06F 3/1256 |

FOREIGN PATENT DOCUMENTS

JP        2001-084245 A     3/2001

OTHER PUBLICATIONS

Print Schema Specification, Microsoft Corporation; Chapter 4. PrintTicket Documents, pp. 35-36, Sep. 5, 2013.

* cited by examiner

*Primary Examiner* — Gabriel I Garcia
(74) *Attorney, Agent, or Firm* — Canon U.S.A., Inc. IP Division

(57) ABSTRACT

Embodiments of the present invention include: storing a setting value corresponding to a first function belonging to a job scope or a document scope included in a print ticket on a storage area; when there is a print ticket for a page among a plurality of pages included in the job, comparing the setting value corresponding to the first function included in the print ticket for the page with the stored the setting value; and, when the compared setting values are different from each other, issuing a control code for separation, and generating a second command for controlling the printing according setting values corresponding to a plurality of functions included in the print ticket for the page.

15 Claims, 12 Drawing Sheets

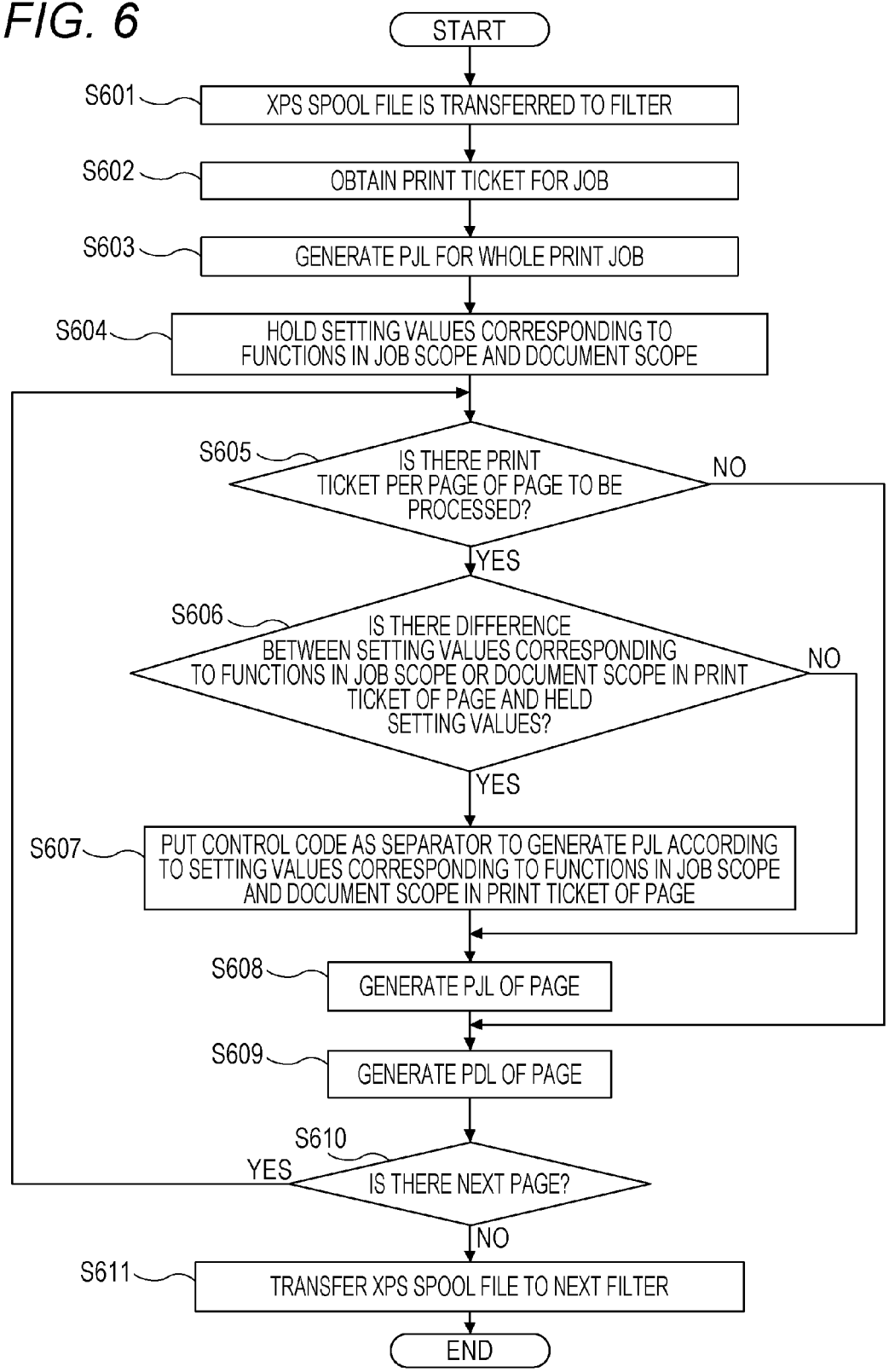

FIG. 7

```xml
<?xml version="1.0" encoding="UTF-8" ?>
<psf:PrintTicket xmlns:psf="http://schemas.microsoft.com/windows/2003/08/printing/printschemaframework" xmlns:xsi="http://www.w3.org/2001/XMLSchema-instance" xmlns:xsd="http://www.w3.org/2001/XMLSchema" version="1" xmlns:psk="http://schemas.microsoft.com/windows/2003/08/printing/printschemakeywords" xmlns:ns0000="http://schemas.company.com/custom/">
<psf:Feature name="psk:PageMediaSize">
  <psf:Option name="psk:NorthAmericaLetter">
    <psf:ScoredProperty name="psk:MediaSizeWidth">
      <psf:Value xsi:type="xsd:integer">215900</psf:Value>
    </psf:ScoredProperty>
    <psf:ScoredProperty name="psk:MediaSizeHeight">
      <psf:Value xsi:type="xsd:integer">279400</psf:Value>
    </psf:ScoredProperty>
  </psf:Option>
</psf:Feature>
<psf:ParameterInit name="psk:JobCopiesAllDocuments">
  <psf:Value xsi:type="xsd:integer">1</psf:Value>
</psf:ParameterInit>
<psf:Feature name="ns0000:PageDuplex">
  <psf:Option name="ns0000:TwoSidedLongEdge" />
</psf:Feature>
</psf:PrintTicket>
```

FIG. 10

```xml
<?xml version="1.0" encoding="UTF-8" ?>
<psf:PrintTicket xmlns:psf="http://schemas.microsoft.com/windows/2003/08/printing/printschemaframework" xmlns:xsi="http://www.w3.org/2001/XMLSchema-instance" xmlns:xsd="http://www.w3.org/2001/XMLSchema" version="1" xmlns:psk="http://schemas.microsoft.com/windows/2003/08/printing/printschemakeywords" >
    <psf:Feature name="psk:PageMediaSize">
        <psf:Option name="psk:NorthAmericaLetter">
            <psf:ScoredProperty name="psk:MediaSizeWidth">
                <psf:Value xsi:type="xsd:integer">215900</psf:Value>
            </psf:ScoredProperty>
            <psf:ScoredProperty name="psk:MediaSizeHeight">
                <psf:Value xsi:type="xsd:integer">279400</psf:Value>
            </psf:ScoredProperty>
        </psf:Option>
    </psf:Feature>
    <psf:ParameterInit name="psk:JobCopiesAllDocuments">
        <psf:Value xsi:type="xsd:integer">1</psf:Value>
    </psf:ParameterInit>
    <psf:Feature name="psk:DocumentDuplex">
        <psf:Option name="psk:TwoSidedLongEdge" />
    </psf:Feature>
</psf:PrintTicket>
```

FIG. 11

```
<FixedPage Width="793.76" Height="1122.56" xmlns="http://schemas.openxps.org/oxps/v1.0"
xml:lang="und">
<Path Data="F1 M 48,173.28 L 745.76,173.28" StrokeEndLineCap="Round"
StrokeStartLineCap="Round" StrokeLineJoin="Round" StrokeThickness="0.5"
Stroke="#ff000000"/>
<Glyphs Fill="#ff00b0f0" UnicodeString="TestPage" Indices="23854,77;23841,78;23856"
OriginY="167.68" OriginX="240.32" StyleSimulations="BoldSimulation"
FontRenderingEmSize="23.1816" FontUri="../Resources/Fonts/BF170770-51CD-4826-A06F-
10CA0984A0AA.odttf" Clip="M 240.32,144 L 292.8,144 292.8,173.28 240.32,173.28 z"/>
<ImageBrush ImageSource="../Resources/Images/1.JPG" Viewbox="0,0,143,183"
TileMode="None" ViewboxUnits="Absolute" ViewportUnits="Absolute"
Viewport="282.4,748.32,228.8,292.8" />
</FixedPage>
```

CONTROL METHOD FOR GENERATING DATA USED FOR PRINTING AND INFORMATION PROCESSING APPARATUS

BACKGROUND OF THE INVENTION

Field of the Invention

The present invention relates to a technique to switch print settings for each page in a printer driver that generates a print job for causing a printer to perform printing.

Description of the Related Art

Some document data to be printed with a printer are set with print settings varying depending on the pages. For example, the first and second pages are vertically printed on an A4 sheet while the pages from the third page are printed horizontally. Furthermore, the pages from the fifth page may be printed on an A3 sheet. Not only the print settings about the sheet, but also the print settings about the finishing may be varied, for example, the one-sided printing setting is changed to the two-sided printing setting for the pages from the seventh page, and stapling (the staple setting) is enabled for the tenth to fourteenth pages. These different settings are implemented with an application that stores the print settings per page, and a printer driver that issues the print data including a control code per page (Japanese Patent Laid-Open No. 2001-84245).

Microsoft (registered trademark) Windows uses Print-Ticket (hereinafter referred to as print ticket) as the print settings for a V4 printer driver. As a concept, a print job includes one or more documents. The document includes a plurality of pages. Such scopes (the job, the document, and the page) are indicated as levels in the print ticket. The settings at the job level are defined to be applied for the whole print job. The settings at the document level are defined to be applied to each document. The settings at the page level are defined to be applied to each page. The name of each setting in the print ticket necessarily has a prefix such as "Job", "Document", or "Page" so that the level of the scope to which the setting is applied can be identified.

However, there are only two new Application Programming Interfaces (APIs) for the printing system of Windows. One is to configure the settings of a whole print job. The other is to configure the settings for each page. An API for drawing, which is referred to as Graphics Device Interface (GDI) and used also in existing systems, configures the settings for a whole print job with CreateDC and the setting for each page with ResetDC. On the other hand, an API for drawing, which is referred to as Direct2D, configures a whole print job with CreateDocumentPackage and the setting for each page with AddPage.

In other words, using such an API of Windows means that it may be impossible to change a setting at the job level or document level of the print ticket of the V4 printer driver in the middle of a print job.

Thus, in order to obtain a desired printing result, it is necessary to previously divide the settings into a plurality of print jobs according to the print settings at the job level instead of changing a setting at the job level of the print ticket in the middle of the job. Note that the settings at the job level and the document level include functions such as layout settings including two-sided printing and NUp, and finishing settings including stapling and punching.

SUMMARY OF THE INVENTION

A control method according to embodiments of the present invention includes: generating a first command for controlling printing according to a setting value included in a print ticket for a whole job; storing a setting value corresponding to a first function belonging to a job scope or a document scope included in the print ticket on a storage area; when there is a print ticket for a page among a plurality of pages included in the job, comparing the setting value corresponding to the first function included in the print ticket for the page with the stored setting value; and, when the compared setting values are different from each other, issuing a control code for separation, and generating a second command for controlling the printing according to setting values corresponding to a plurality of functions included in the print ticket for the page.

Further features of the present invention will become apparent from the following description of exemplary embodiments (with reference to the attached drawings).

BRIEF DESCRIPTION OF THE DRAWINGS

FIG. 6 is a flowchart for describing a conversion process of data by a V4 printer driver.

FIG. 7 illustrates an exemplary print ticket that defines a function that originally belongs to a document scope as a function that belongs to a page scope in an extended region.

FIG. 10 illustrates an exemplary print ticket included in an XPS spool file.

FIG. 11 illustrates exemplary FixedPage included in an XPS spool file.

DESCRIPTION OF THE EMBODIMENTS

Embodiments of the present invention will be described hereinafter with reference to the appended drawings.

First Exemplary Embodiment

Figure 1:
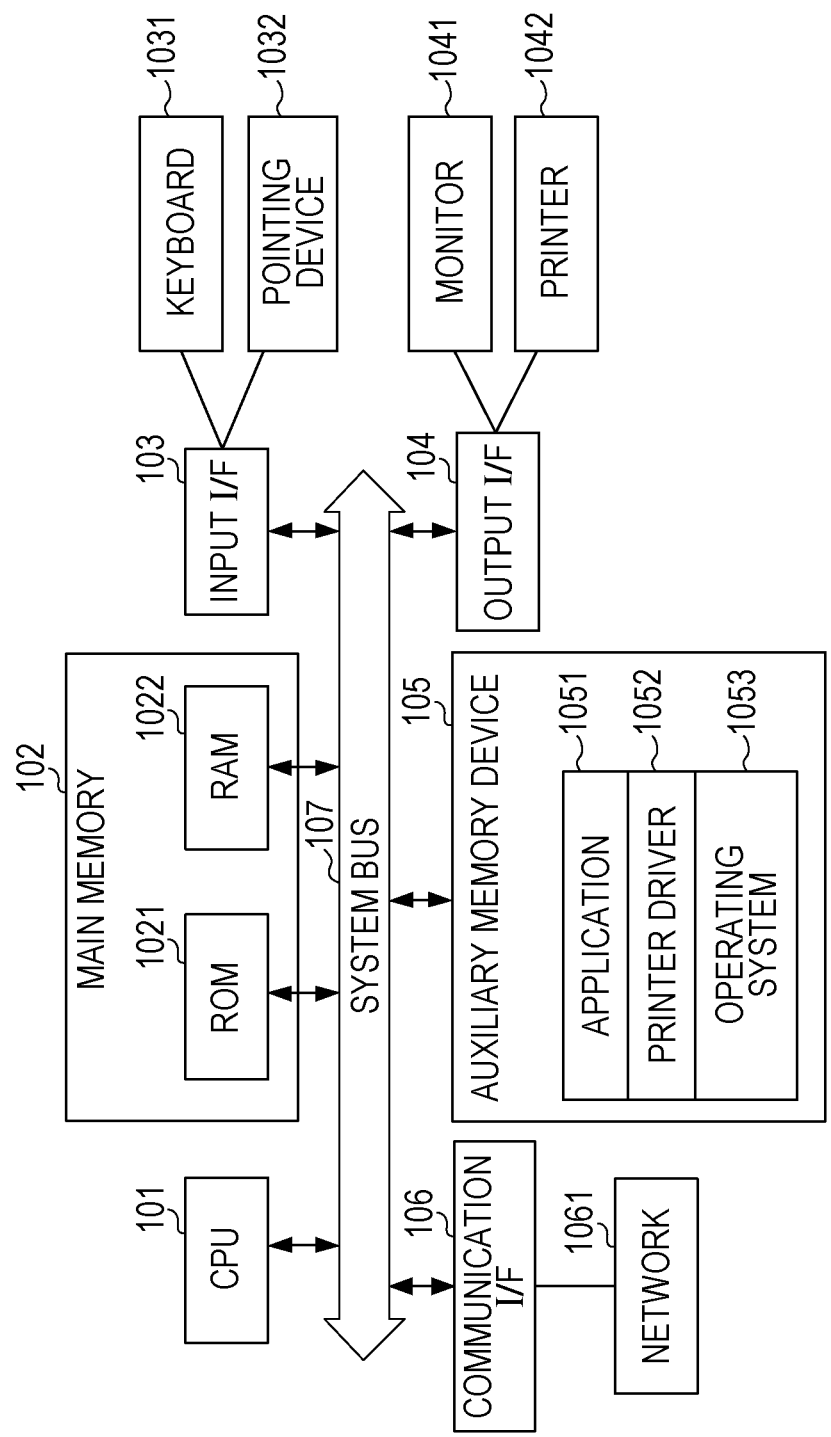
FIG. 1 is an exemplary block diagram of a configuration of hardware and software of an information processing apparatus.

FIG. 1 is a block diagram of a configuration of a system using a typical information processing apparatus (computer) and depicts an embodiment of the present invention. Needless to say, the present invention may be applied to any configurations that perform the functions of the present invention, such as a discrete functional unit, a system including a plurality of devices, and a system connected via a network to perform a process unless otherwise noted.

A CPU 101 controls the whole information processing apparatus according to a program stored on a ROM 1021 or a RAM 1022 in a main memory 102, or on an auxiliary memory device 105. The RAM 1022 is also used as a work area when the CPU 101 performs various processes. The auxiliary memory device records, for example, an application 1051, a printer driver 1052, and an operating system (OS) 1053. An input device such as a keyboard 1031, or a pointing device 1032 typified by a mouse or a touch panel is a device that the user uses to give various instructions to a computer via an input I/F 103. An output I/F 104 is an interface for outputting data to the outside, and outputs data to an output device such as a monitor 1041 or a printer 1042. The output I/F 104 may be connected to the printer 1042 not only via a local I/O directly connected but also via a network 1061 connected via a communication I/F 106. A system bus 107 is a common data system bus used to exchange data, for example, between an I/F and a module. Note that the CPU 101 implements each step of the flowcharts, which the printer driver 1052 of embodiments of the present invention performs, by reading a program about the flowchart from the auxiliary memory device 105 or the RAM 1022 and executing the program. In addition, the printer 1042 may be a printing apparatus only having a printing function, a FAX apparatus only having a FAX function, or a multifunction apparatus having plurality of functions including a scanning function and a printing function. Note that the printer 1042 is referred to also as an image processing apparatus or an image forming apparatus.

Figure 2:
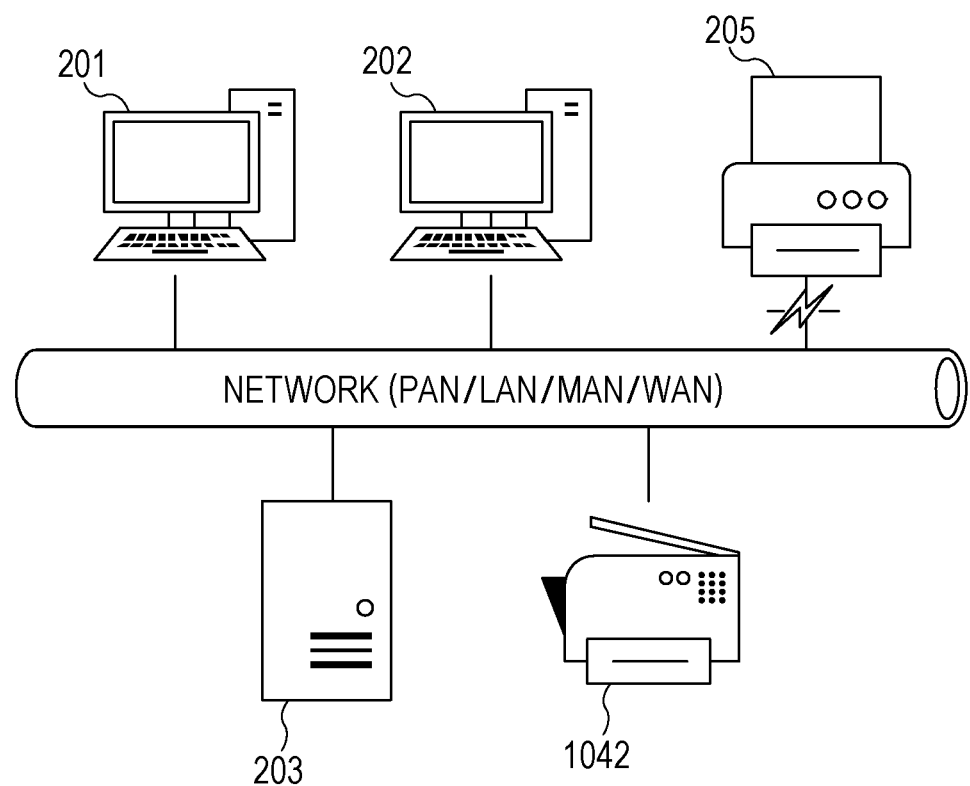
FIG. 2 illustrates an exemplary network configuration in which clients, a server, and printers are connected.

FIG. 2 schematically illustrates an environment of the network 1061 in an embodiment of the present invention.

One or a plurality of client computers 201/202 that create documents and images to be printed is/are connected to a network. Furthermore, a server computer 203 that manages a user of the client computer and a printer is sometimes connected to the network. One or a plurality of printers 205 and/or 1042 is/are connected to the network. Note that FIG. 2 illustrates that the printer 205 is physically connected to the network but is in an offline state in which the printer 205 is not actually available. The network includes small and large networks such as a Personal Area Network (PAN), a Local Area Network (LAN), a Metropolitan Area Network (MAN), and a Wide Area Network (WAN). The devices described above are connected to all the networks. For example, the server and the printer may be connected, for example, to cloud computing over the Internet. In other words, the information processing apparatus is an apparatus, capable of being connected to another device (for example, an image processing apparatus such as a printer).

Figure 3:
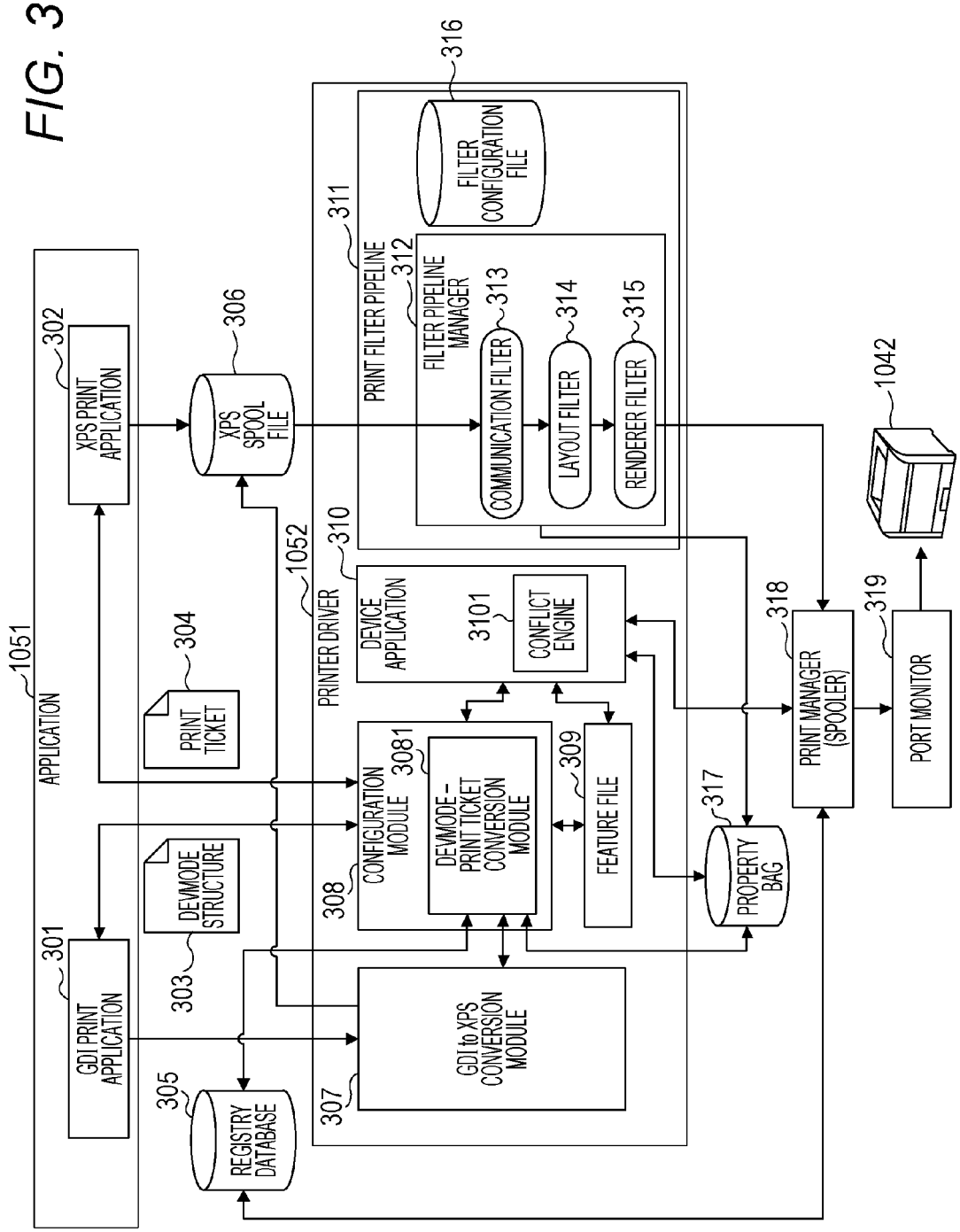
FIG. 3 illustrates an exemplary configuration of a print system including a V4 printer driver.

FIG. 3 is a block diagram of a configuration of a print system of a V4 printer driver established in the client computer 201/202. The illustrated print system includes a function module that the OS 1053 includes.

The V4 printer driver print system performs printing, using a file format referred to as XML Paper Specification (hereinafter, abbreviated to XPS) as spool data. Software components 1051, 1052, and 1053 in FIG. 3 are stored on the auxiliary memory device 105 and loaded onto the RAM 1022 when being executed by the CPU 101.

The V4 printer driver print system operates on the OS 1053. A print manager 318, a GDI to XPS conversion module 307, and a filter pipeline manager 312 are the modules included the OS 1053.

The GDI to XPS conversion module 307, and the filter pipeline manager 312 are included in the printer driver 1052. The GDI to XPS conversion module 307, and the filter pipeline manager 312 are modules that the OS 1053 provides exclusively to the printer driver 1052.

Filters 313 to 315 that are the filters for the printer driver 1052 and the filter pipeline manager 312, and a device application 310 are stored as the printer driver 1052 on the auxiliary memory device 105 of FIG. 1. Note that the device application 310 is automatically installed via the network with the installation of the printer driver.

A GDI print application 301 (hereinafter, abbreviated to GDI application) and an XPS print application 302 (hereinafter, abbreviated as XPS application) are stored as the application 1051 on the auxiliary memory device 105 of FIG. 1. The GDI application 301 performs printing, using a Graphics Device Interface (GDI) provided by the OS 1053. The XPS application 302 performs printing, directly using the XPS spool file 306. The user instructs a printing process from the application 301 or XPS application 302 displayed on a monitor 1041 of the output device, using an input device such as the keyboard 1031 or the touch panel/mouse 1032. The printing process is implemented when three processes "selection of a printer", "creation of print setting data", and "conversion of drawing data" are performed in order. The flow of the printing process will be described hereinafter.

(1) "Selection of Printer"

First, the user selects a device to be used for printing (for example, the printer 1042). The fact that user selects the printer 1042 means that the user selects the printer driver 1052 corresponding to the printer 1042 that performs the printing.

(2) "Creation of Print setting data"

Next, print setting data is created. When the print setting data is created, the application 1051 allocates a memory area for the print setting data in the RAM 1022. Then, the application invokes the configuration module 308 of the printer driver 1052 to create and store the print setting data.

The GDI application 301 uses a binary DEVMODE structure 303 as the print setting data whereas the XPS application 302 uses a print ticket 304 described in an eXtensive Markup Language (XML) that is a markup language. The DEVMODE structure 303 includes a default region defined by the operating system and art extended region uniquely defined by the printer driver. The print ticket 304 is the print setting data described in an XML format. The default region and the extended region are described with separate namespaces. The print setting data also includes the information inherent in the model, so that the configuration module 308 creates the print setting data using a feature file 309.

The application 1051 changes a print setting by rewriting the content of the DEVMODE structure 303 or the print ticket 304. The print setting data includes the setting values necessary for printing, such as the information about the sheet size to be output (for example, "A4"), designation of two-sided printing, polychrome or monochrome printing, and designation of a sheet feeding stage. The specification of the default region of the print setting data is opened externally. Thus, the application may directly be changed. Only the printer driver 1052 holds the detailed specification of the extended region depending on the printer 1042. Thus, the user normally configures the specification using a user interface included in the device application 310. Differently from the DEVMODE structure 303, the setting values of the print ticket 304 are described in an XML format so that the XPS application 302 can directly change and rewrite all the setting values. However, the extended region is uniquely defined by the printer driver. Thus, the detailed specification is not disclosed and varies depending on the printer 1042. This makes it easier for the user to use the user interface of the device application 310 in order to change the setting value.

The device application 310 is a printer driver 1052, but is installed as a program different from the printer driver onto the client computer 201/202. The device application 310 exchanges the print setting data with the printer driver using the print ticket 304. The device application 310 holds a conflict engine 3101 to solve an invalid combination of the print setting data and create correct print setting data. Invalid combinations of the print setting data are described in the feature file 309. Thus, the conflict engine 3101 reads the feature file 309 before displaying the user interface.

The printer driver 1052 changes the setting depending on the printer 1042 in the DEVMODE structure 303 or the print ticket 304 according to the content designated via the user interface. The print setting data is required each time a document is printed. Thus, the print setting data is created for each printing. The printer driver about the option device of the printer 1042 or the environmental settings of each user is stored on a registry database 305 or a property bag 317 of the OS 1053. A print manager 318 of the operating system stores the default values of the print setting data on the registry database 305. The registry database 305 and the property bag 317 are stored on the auxiliary memory device 105.

(3) "Conversion of Drawing Data"

Finally, the user instructs the start of a printing process via a screen provided by the application 1051 after the print setting data is fixed.

When the printing is performed with the GDI application 301, drawing data is transmitted from the GDI application 301 to the GDI to XPS conversion module 307. Then, the XPS spool file 306 created. At that time, the GDI to XPS conversion module 307 invokes the configuration module 308 to convert the print setting data from the DEVMODE structure 303 into the print ticket DEVMODE-print ticket conversion module 3081 is used for the conversion. The DEVMODE-print ticket conversion module 3081 can read and write the information on the property bag 317 and thus can refer to and convert the data stored by the device application 310.

When the printing is performed with the XPS application 302, there is two ways to create the XPS spool file 306. One is that the XPS application creates the XPS spool file 306. The other way is that the OS 1053 creates the XPS spool file 306 according to a drawing command from the XPS application. The XPS spool file 306 is created in the middle of the printing either way.

As described above, a feature of the V4 printer driver print system is to necessarily create the XPS spool file 306 based on the drawing data when printing is performed. After the XPS spool file 306 is created, the process is transferred to a print filter pipeline 311. The print filter pipeline 311 is a mechanism to perform printing through a plurality of filters and a filter configuration file 316 controls the number and order of filters. A filter pipeline manager 312 operating in the print filter pipeline 311 performs processes, for example, in order of a communication filter 313, a layout filter 314, and a renderer filter 315 according to the filter configuration file 316 in the present embodiment. The number, types, and order of filters vary depending on the configuration of the printer driver 1052. For example, an encryption filter to encrypt the print job may be included in addition to the three filters in FIG. 3.

The print system performs the printing process by transferring the XPS spool file 306 to the filters. Each of the filters processes the XPS spool file 36 and transfers the processed XPS spool file 306 to the next filter. This makes the printing proceed. Finally, the XPS spool file 306 is converted into a print job and transmitted to the printer. Note that the printer can interpret the print job, and performs a printing process based on the transmitted print job by interpreting the print job. Each of the filters can store its unique data on the property bag 317. Furthermore, each of the filters can obtain the information about the OS 1053 and the data of the other filters from the property bag 317.

The communication filter 313 obtains the information required to perform printing in order to rewrite the print ticket 304, or store the data obtained from the printer on the property bag 317. The layout filter 314 performs a process related to the layout including changing the magnification, the layout for binding, or the layout of a stamp. The layout filter 314 operates according to the print ticket 304 included in the XPS spool file 306. Thus, for example, when a layout setting does not exist in the print ticket 304, the layout filter 314 transfers the XPS spool file 306 to the next filter without performing any process. The renderer filter 315 converts the input XPS spool file 306 into a Page Description Language (hereinafter, abbreviated to PDL) by rendering. The renderer filter 315 further converts the setting included in the default region in the print setting data of the print ticket 304 into a Printer Job Language (hereinafter, abbreviated to PJL). The renderer filter 315 creates a print job by combining the PDL and the PJL and transfers the print job as stream data to the next filter. The renderer filter 315 combines the converted PJL, and the transferred PDL and PJL as a print job, and transfers the combined print job to the filter pipeline manager 312. The print job is transmitted to the print manager 318 that manages the schedule of the printing process. Such print jobs are consecutively registered in a queue.

The print manager 318 communicates with the printer 1042 and transmits the print jobs in order of registration in the queue via the port monitor 319 as soon as the printer 1042 is ready to print.

As described above, a main role of the printer driver is to convert the drawing data and the print setting data into a print job, and the printing is performed in the client computer 201/202.

Note that embodiments of the present invention may be applied to a FAX transmission process although a printing process is used for description and the printer driver is described in the present embodiment. In such a case, a FAX filter for creating FAX data installed instead of the renderer filter 315, and a FAX driver is used to transmit the FAX data to a FAX apparatus.

Figure 4:
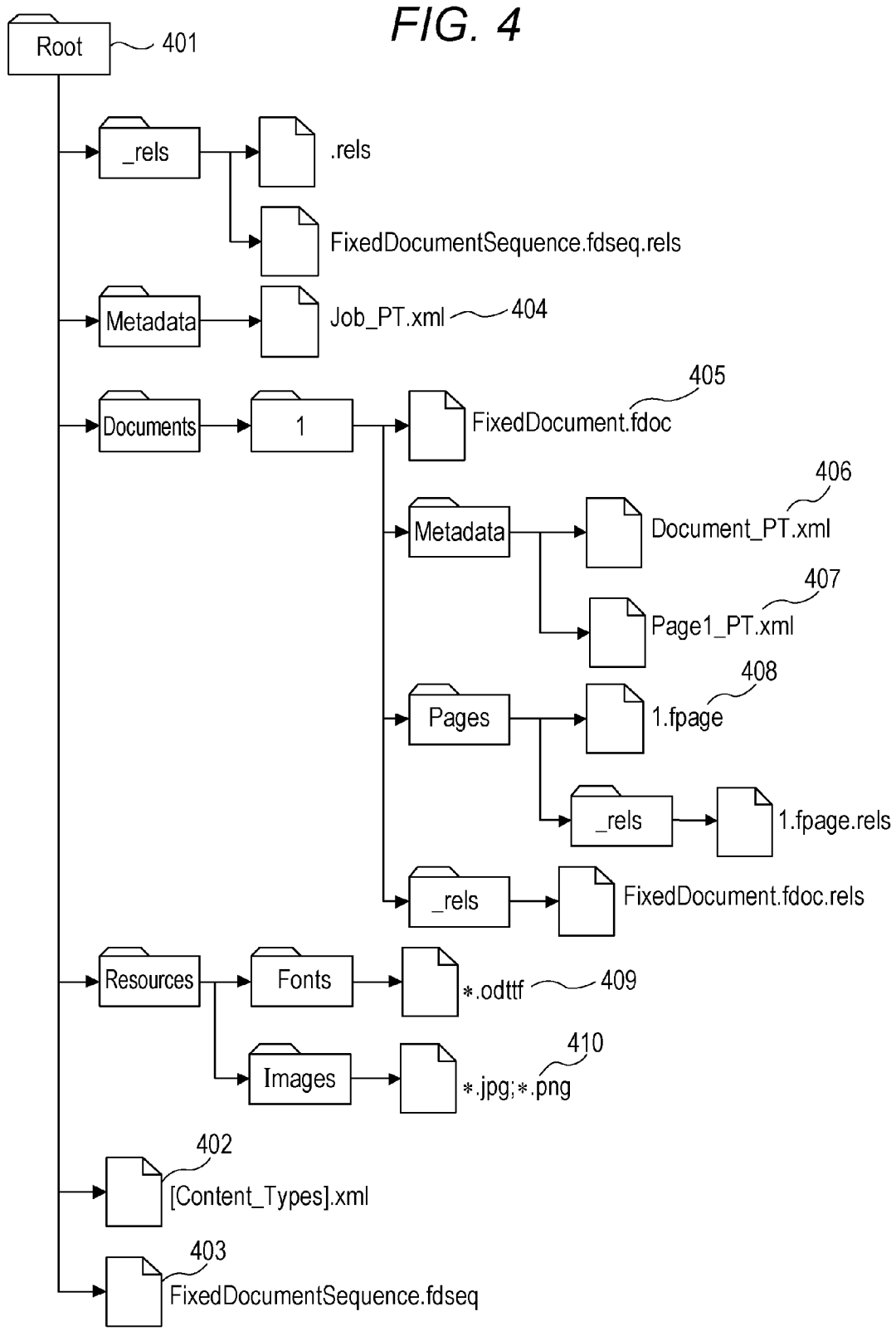
FIG. 4 illustrates an exemplary data structure of an XPS spool file.

FIG. 4 illustrates an exemplary data structure of an XPS spool file.

The XPS spool file 306 has a tree structure that starts from Root 401 and includes folders, XML files, and binary resources. The XML files included in the XPS spool file 306 are broadly divided into rels files and the other files. An association (relationship) indicating what role each XML file has is described in the rels file.

A file "[Content_Types].xml" 402 associates all the files included in the XPS spool file 306 with the types of resources.

A file "FixedDocumentSequence.fdseq" 403 indicates the document included in the XPS spool file 306. Here, the file "FixedDocumentSequence.fdseq" 403 indicates a file "FixedDocument.fdoc" 405.

A file "Job_PT.xml" 404 is the print ticket for the whole print job. A file "Document_PT.xml" 406 is the print ticket for a document. A file "Page1_PT.xml" 407 is the print ticket for each page.

FIG. 10 illustrates an exemplary print ticket 304. The print settings included in the print ticket 304 are divided into the setting acting on the whole job, the setting acting on the document, and the setting acting only on a page, depending on the functions. The setting acting on the whole job has a prefix "Job" in its function name. The setting acting on the whole job is JobCopiesAllDocuments indicating the number of copies in the example of FIG. 10. The setting acting on the document has a prefix "Document" in its function name. The setting acting on the document is DocumentDuplex indicating two-sided print setting in the example of FIG. 10. The setting acting only on a page has a prefix "Page" in its function name. The setting acting only on a page is PageMediaSize indicating the sheet size in the example of FIG. 10. The divisions are distinctively referred to as the scopes or the levels. Mostly, the functions for controlling the characteristics of the printer engine such as the color and the image quality are classified as a job scope; the finishing functions such as stapling, punching, and two-sided printing, and the layout functions such as Nup are classified as a document scope; and the functions related to the sheet such as the size or the orientation are classified as a page scope.

In general, the print ticket for each page such as the Page1_PT.xml 407 only includes the functions in the page scope. The print ticket for the whole job includes the functions in all of the scopes from the job to page scopes. When the print ticket for each page does not exist in the XPS spool file, the settings indicated in the print ticket for the whole job are reflected in each page.

The XPS spool file 306 may include a plurality of documents although including only a document in FIG. 4. The "FixedDocument.fdoc" 405 indicates the pages included in the document "FixedDocument.fdoc" 405 in the XPS spool file 306. Only a page exists in FIG. 4, so that the document "FixedDocument.fdoc" 405 indicates only "1.fpage" 408. The "1.fpage" 408 is the drawing data about a page referred to as FixedPage and described in an XML format. FIG. 11 illustrates exemplary FixedPage. The Path renders a line or a graphic pattern. The Glyphs renders a text. The ImageBrush renders a picture image.

Figure 12:
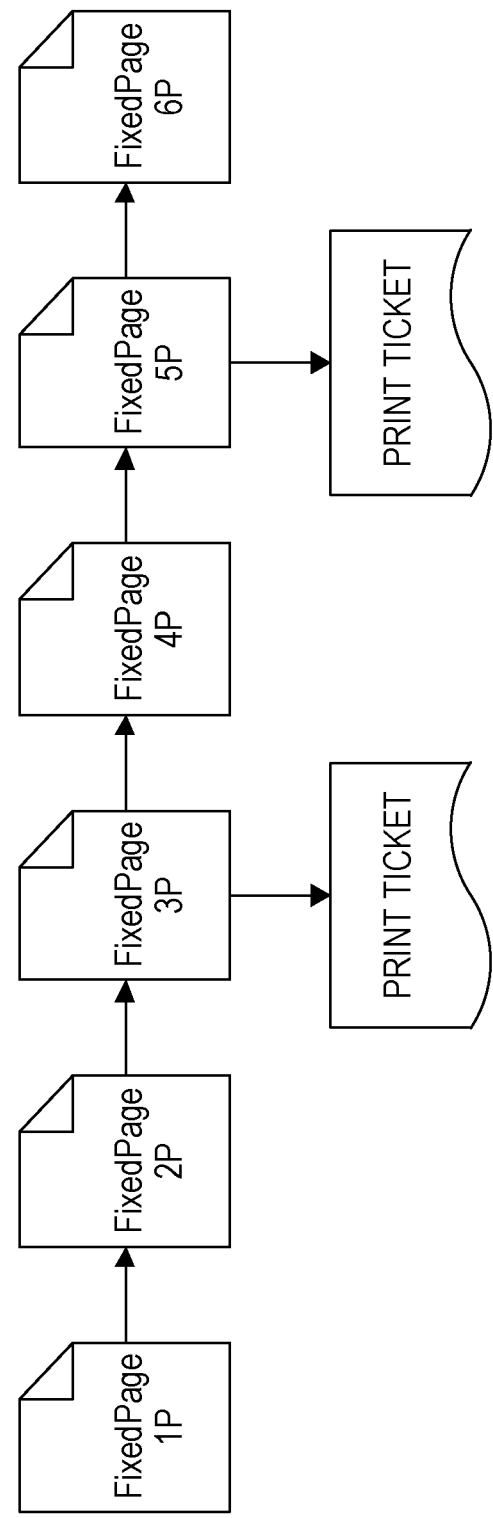
FIG. 12 is a schematic diagram of a plurality of pages included in an XPS spool file and a print ticket that is applied to each page.

FIG. 12 illustrates an example similarly to the XPS spool file 306 including a plurality of pages. FIG. 12 illustrates the example in which print tickets for two pages among six pages of FixedPage exist. In such a case, the third and fifth pages are printed according to the print ticket for each page, and the other pages are printed according to the print ticket for the whole print job.

The "*.odttf" 409 in the XPS spool file of FIG. 4 is font data. The font data used for expressing a text is embedded as a subset extracting the data to be used for the text. The "*.jpg;*.png" 410 is picture image data such as JPEG or PNG. As described above, a feature of the XPS spool file 306 is that the XPS spool file 306 includes many small parts. In addition, the parts are collected and compressed in ZIP compression. Another feature is that the parts are collected as a file and this collection reduces the size.

A technique in which the application 1051 and the renderer filter 315 of the V4 printer driver switch the print settings in the job scope or the document scope using the print ticket 304 for each page will be described next with reference to the flowcharts in FIGS. 5 and 6.

The details of a process that the application 1051 performs in consideration of switching the print settings per page when printing is performed with the V4 printer driver will be described first with a flowchart in FIG. 5. Note that the application 1051 according to embodiments of the present invention is stored on the auxiliary memory device 105 of the computer, and is read by the RAM 1022 and executed by the CPU 101.

In S501, the application 1051 creates the print settings for a whole print job according to the format of a sheet to be output. In S502, the application 1051 declares to the OS 1053 that the application 1051 starts to print, using API (StartDoc). At the declaration, the application 1051 can configure the print settings created in S501 as the print settings for the whole job by designating the created print settings with the API.

In S503, the application 1051 determines whether to change the print settings from the next page before drawing a page to be processed in the job. If the application 1051 changes the print settings from the next page, the process goes to S504. If not, the process goes to S506.

In S504, the application 1051 creates the print settings (the print ticket) for the page of which print settings to be changed. At that creation, the application 1051 creates the print settings (the print ticket) for a whole including not only the functions in the page scope indicating the values of the print settings to be changed but also the functions in the document scope and the job scope. Then, in S505, the application 1051 designates the created print settings (print ticket) with the API of the OS 1053 that changes the page setting. The API used here is MXDC_ESCAPE.

In S506, the application 1051 draws the page to be printed. The application 1051 only draws the page as normal when the print settings are not changed in the middle of the printing.

In S507, the application 1051 determines whether the page drawn in S506 is the last page of the job. If the drawn page is not the last page, the process returns to S503. The application 1051 repeats S503 to S506 to print a plurality of pages included in the job. In S508, the application 1051 declares to the OS 1053 that the application 1051 terminates the printing, using API (EndDoc).

Figure 5:
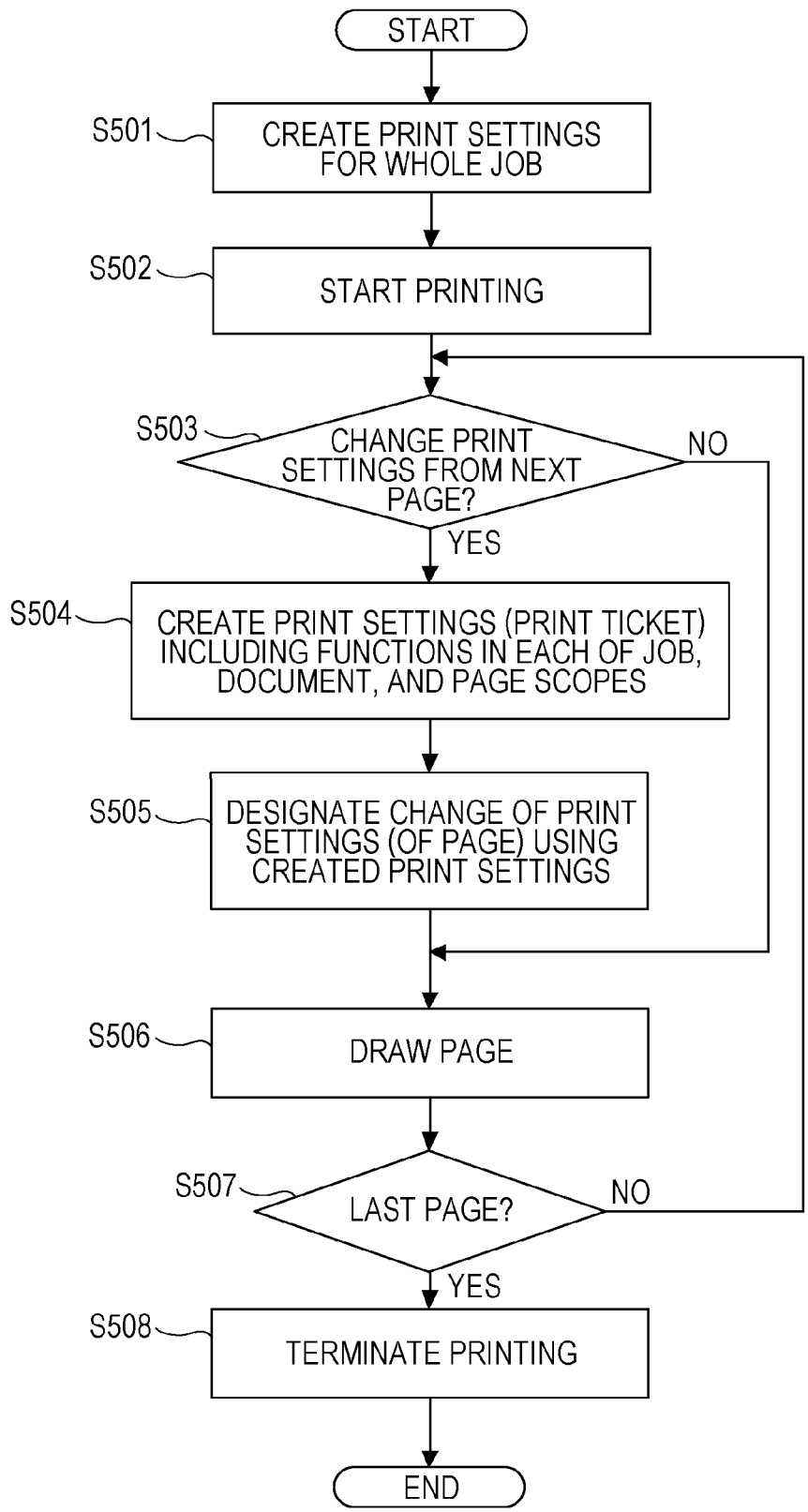
FIG. 5 is a flowchart for describing a process by an application in consideration of a change of a print setting for each page.
Figure 8:
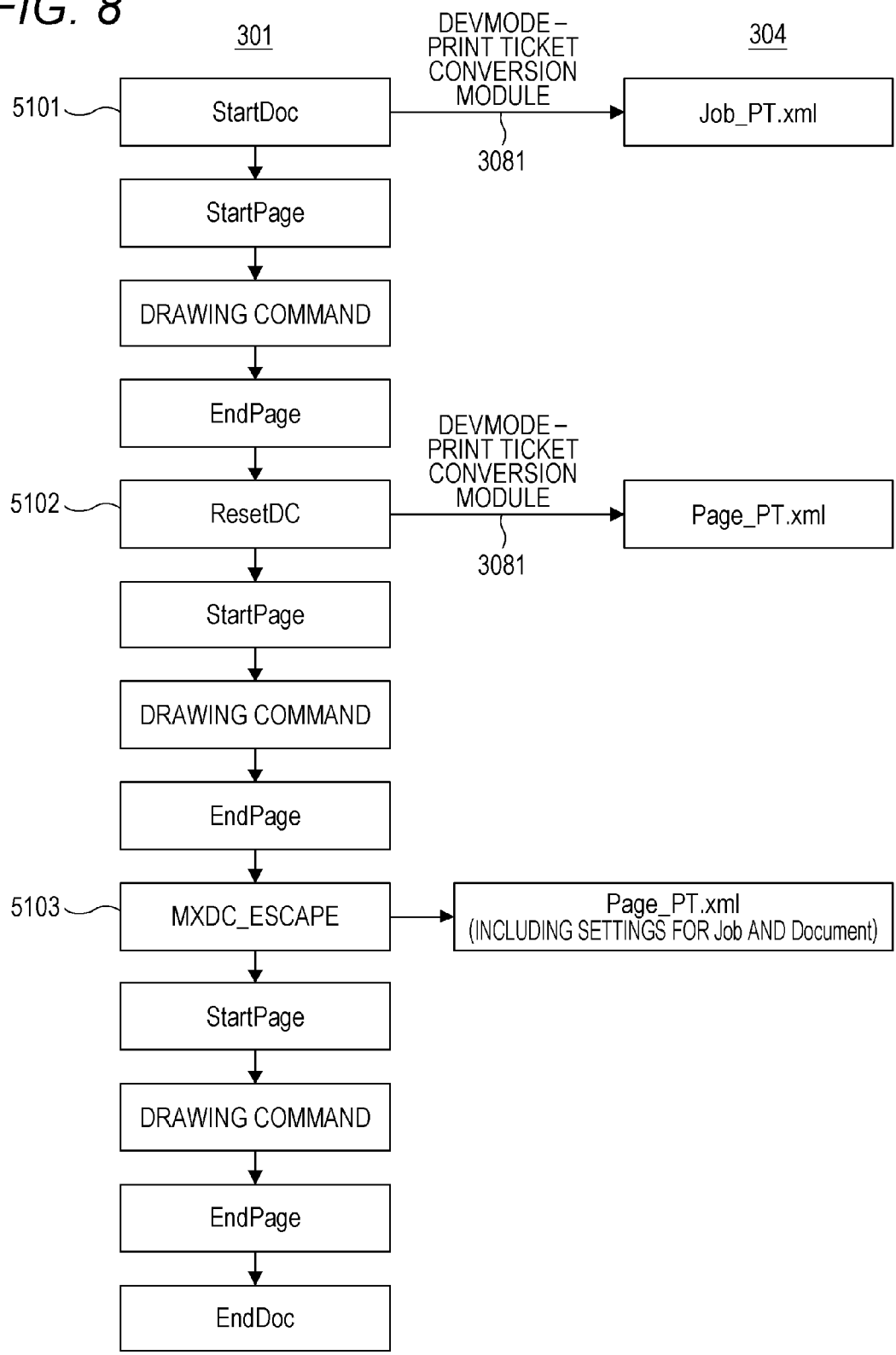
FIG. 8 illustrates an exemplary order of APIs used for printing by a GUI application.

FIG. 8 illustrates APIs in order in which the GDI application 301 invokes when performing printing along the flowchart of FIG. 5. Note that the GDI application 301 is stored on the auxiliary memory device 105 of the computer, and is read by the RAM 1022 and executed by the CPU 101.

The GDI application 301 invokes the API (StartDoc) for starting printing to generate a print ticket for a job using the DEVMODE-print ticket conversion module 3081 (5101).

There are two APIs for switching the settings for each page, an API (5102) referred to as ResetDC and an API (5103) referred to as MXDC_ESCAPE.

Similarly to the StartDoc, the ResetDC generates a print ticket for a page using the DEVMODE-print ticket conversion module 3081.

On the other hand, the MXDC_ESCAPE is used when the GDI application 301 generates a print ticket by itself for direct insertion. In general, the GDI application 301 uses the DEVMODE structure to create a print ticket. When the GDI application 301 uses the MXDC_ESCAPE (5103), the GDI application 301 generates the print ticket by itself. As described above in S505 of FIG. 5, the GDI application 301 uses the MXDC_ESCAPE as the API used to switch (change) the setting for each page instead of the ResetDC. This is because only a print ticket only including the functions in the page scope can be generated with the DEVMODE-print ticket conversion module 3081 when the ResetDC (5102) is used.

Figure 9:
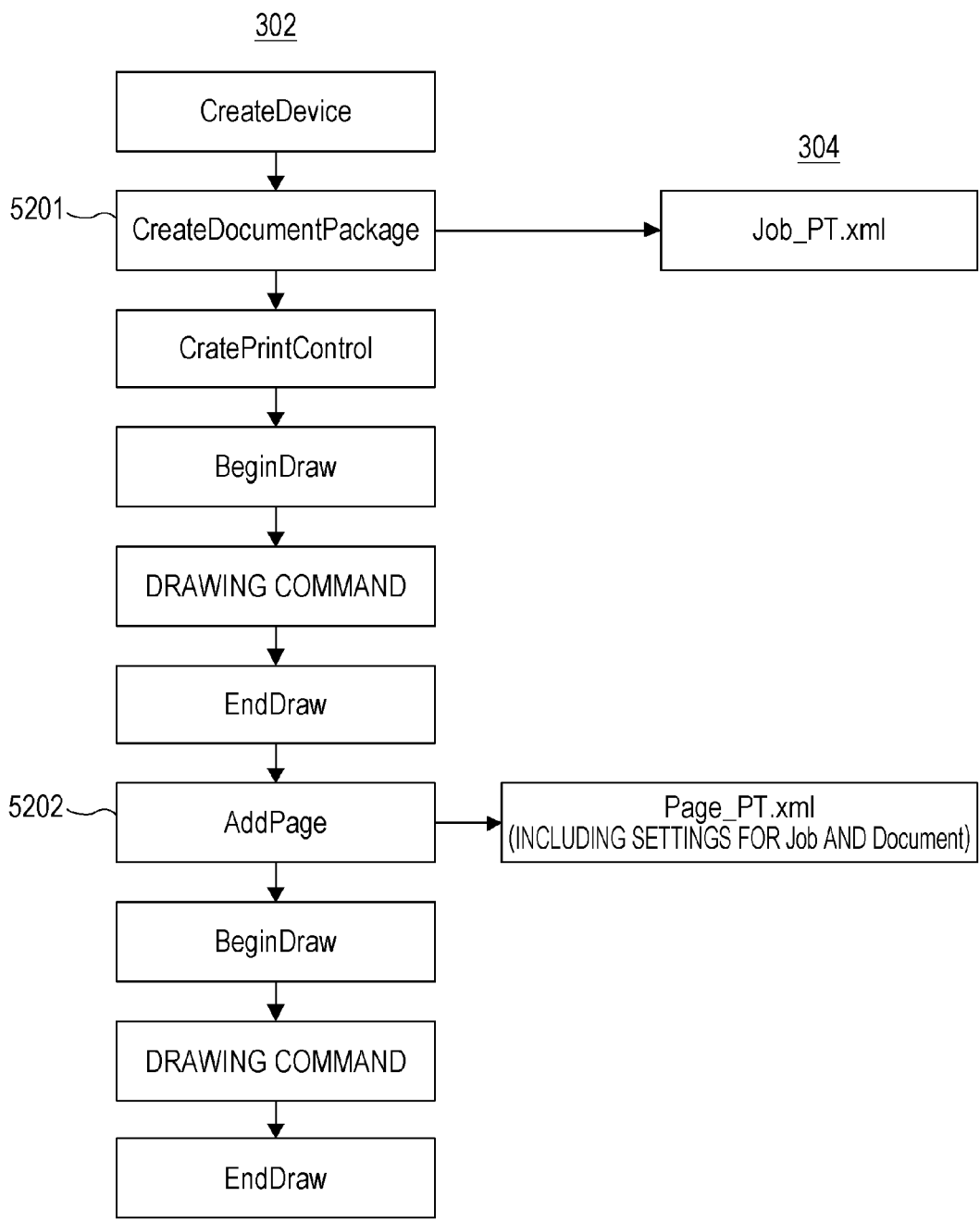
FIG. 9 illustrates an exemplary order of APIs used for printing by an XPS application.

FIG. 9 illustrates APIs in order in which the XPS application 302 invokes when performing printing along the flowchart of FIG. 5 using an API group referred to as Direct2D. Note that the XPS application 302 is stored on the auxiliary memory device 105 of the computer, and is read by the RAM 1022 and executed by the CPU 101.

The XPS application 302 designates the print ticket 304 for the whole job, which the XPS application 302 creates by itself, with an API referred to as CreateDocumentPackage to apply the print settings for the whole job (5201). Similarly, the XPS application 302 uses an API referred to as AddPage to designate the print ticket 304 for the whole job, which the XPS application 302 creates by itself, to switch the print settings for each page.

The details of a process in which the renderer filter 315 of the V4 printer driver converts the XPS spool file, which is processed by the application 1051 in the process of FIG. 5, into print data will be described with reference to the flowchart of FIG. 6.

In S601, the renderer filter 315 receives the XPS spool file 306 from the filter pipeline manager 312. In 3602, the renderer filter 315 obtains the print ticket for the whole job from the XPS spool file 306. In S603, the renderer filter 315 interprets the print ticket for the whole job and generates a PJL that is a printer job language for the whole print job. In S604, the renderer filter 315 stores the setting values of the print setting items corresponding to a plurality of functions in the job scope and the document scope of the print ticket for the whole job on the storage area (for example, the RAM 1022).

In S605, the renderer filter 315 checks whether there is a print ticket for the page that is currently to be processed among the pages in the print job in the XPS spool file 306. If there is the print ticket 304 for the page that is currently to be processed, the process goes to S606. If there is not the print ticket for the page, the process goes to S609.

In S606, the renderer filter 315 compares the print setting items corresponding to the functions belonging to the job scope and the document scope included in the print ticket for each page with the setting values of the print setting items held in S604, respectively. If there is a difference between the setting values of any of the print setting items, the process goes to S607. If there is not a difference between the setting values, the process goes to S608.

Here, the fact that the process goes to S607 means that at least a print setting value corresponding to any of functions belonging to the job scope or the document scope is changed in one of the pages included in the job.

In S607, the renderer filter 315 puts a control code (a PJL command) as a separator to make the printer 1042 recognize that the job or the document is switched. Issuing such a control code can generate another PJL for control the printing, which has at least a different print setting value corresponding to any of functions belonging to the job scope or the document scope from the previous print setting value in a page in the job. Note that, in order to change a setting value corresponding to a function belonging to the page scope, a PJL command about the page to be processed is issued as normal, or the PDT drawing data is switched, instead of putting a control code as a separator. In S607, the renderer filter 315 further generates a PJL that is different from the PJL generated in S603 and according to the setting values corresponding to the functions in the job scope and the document scope included in the print ticket for the page to be processed.

In S608, the renderer filter 315 generates a PJL of the page to be processed from the print ticket for that page.

In S609, the renderer filter 315 obtains FixedPage from the XPS spool file 306 to generate a PDL of the page to be processed.

On S610, the renderer filter 315 determines whether the last page is processed. If there is a next page, the process returns to S605 and the renderer filter 315 repeats S605 to S609. If there is not a next page, in other words, if the renderer filter 315 recognizes that the process of the last page is completed, the renderer filter 315 transmits the XPS spool file 306 to the next filter in S611 and ends the process.

As described above, the present exemplary embodiment enables switching (changing) a function belonging to scopes other than the page scope, such as stapling, punching, or two-sided printing, at a page in the middle of the job when the V4 printer driver is used.

Second Exemplary Embodiment

A setting value included in the print ticket for a page sometimes conflicts with a setting value included in the print ticket for another page among a plurality of pages in a job in the first exemplary embodiment.

For example, there are a print ticket for the fourth page and a print ticket for the sixth page in a job, and a setting value for turning the staple setting ON is described in the print ticket for the fourth page and a setting value for turning the punch setting ON is described in the print ticket for the sixth page. When the printer 1042 is a model that does not enable the stapling function and the punching function simultaneously, it may be impossible to reflect the setting for the sixth page in the output result.

In light of the foregoing, in the flowchart of FIG. 6 of the first exemplary embodiment, the renderer filter 315 also checks the setting value of another function likely to conflict with the function of which setting value is changed when comparing the changed setting value with the previously held content in S606. When there is a conflict, the renderer filter 315 compares the priorities of the conflicting functions. When the function of which setting value is changed is given a lower priority, the process in S607 is skipped. The order of priorities of the functions is previously defined.

Such a process enables properly changing the print settings in a page in the middle of a job according to the priority order among the functions.

Another Embodiment

FIG. 7 illustrates a print ticket that defines two-sided print settings, which are normally defined as a function belonging to the document scope, as a function belonging to the page scope. As a part surrounded by a frame illustrated in FIG. 7, the print ticket defines the two-sided print settings as a function belonging to the page scope in an extended region that the printer driver uniquely defines. The name of the function includes a prefix "Page".

Such definition makes it possible to treat the two-sided print settings as a function for a page. This enables the GDI application 301 to switch the print settings without using the MXDC_ESCAPE (5103).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167778, filed Aug. 30, 2016, which is hereby incorporated by reference herein in its entirety.

What is claimed is:

1. A control method in an information processing apparatus, the method comprising:
receiving document data that has a layer structure and is able to contain a print ticket corresponding to each layer;
generating a first command for controlling printing according to a setting value included in a print ticket of a first layer contained in the received document data for a whole print job;
if there is a setting value corresponding to a first function belonging to a job scope or a document scope among setting values included in the print ticket of the first layer, storing the setting value corresponding to the first function on a storage area;
generating page data that is to be included in a print job on a basis of the received document data;
when there is a print ticket of a second layer that is lower than the first layer and is to be set for a page when the page data is generated, comparing a setting value corresponding to the first function included in the print ticket for the page with the stored setting value; and
when the compared setting values are different from each other, issuing a control code for separation and generating a second command for controlling the printing according to setting values corresponding to a plurality of functions included in the print ticket for the page,
wherein, when the compared setting values are not different from each other, next page data based on the received document data is generated without issuing the control code.

2. The control method according to claim 1, wherein the print ticket for the page is a print ticket including a plurality of setting values corresponding to functions belonging to each of a job scope, a document scope and a page scope inserted with an Application Programming Interface (API) provided by an operating system when an application changes the setting value corresponding to at least any one of the functions in the job.

3. The control method according to claim 2, wherein the API used to insert the print ticket for the page is not an interface for inserting a print ticket only including a setting value corresponding to functions belonging to the page scope but an interface for inserting a print ticket including a plurality of setting values corresponding to functions belonging to each of the job scope, the document scope, and the page scope.

4. The control method according to claim 1, wherein the first function includes at least any one of a function for adjusting a property of a printer engine, a finishing function, and a layout function.

5. The control method according to claim 4, wherein the finishing function includes at least any one of a stapling function, a punching function, and a two-sided printing function.

6. The control method according to claim 4, wherein the layout function includes an Nup function.

7. The control method according to claim 1, further comprising:
skipping generation of a command for controlling printing according to setting values corresponding to a plurality of functions included in the print ticket for the page when the setting value corresponding to the first function included in the print ticket for the page is different from the stored setting value in the comparison, the setting value corresponding to the first function included in the print ticket for the page conflicts with the stored setting value, and the setting value corresponding to the first function included in the print ticket for the page is given a priority lower than the stored setting value.

8. A non-transitory computer readable storage medium on which is stored a computer program for making a computer execute a control method for an information processing apparatus, the control method comprising:
receiving document data that has a layer structure and is able to contain a print ticket corresponding to each layer;
generating a first command for controlling printing according to a setting value included in a print ticket of a first layer contained in the received document data for a whole print job;
if there is a setting value corresponding to a first function belonging to a job scope or a document scope among setting values included in the print ticket of the first layer, storing the setting value corresponding to the first function on a storage area;
generating page data that is to be included in a print job on a basis of the received document data;
when there is a print ticket of a second layer that is lower than the first layer and is to be set for a page when the page data is generated, comparing a setting value corresponding to the first function included in the print ticket for the page with the stored setting value; and
when the compared setting values are different from each other, issuing a control code for separation and generating a second command for controlling the printing according to setting values corresponding to a plurality of functions included in the print ticket for the page,
wherein, when the compared setting values are not different from each other, next page data based on the received document data is generated without issuing the control code.

9. The non-transitory computer readable storage medium according to claim 8, wherein the print ticket for the page is a print ticket including a plurality of setting values corresponding to functions belonging to each of a job scope, a document scope and a page scope inserted with an Application Programming Interface (API) provided by an operating system when an application changes the setting value corresponding to at least any one of the functions in the job.

10. The non-transitory computer readable storage medium according to claim 9, wherein the API used to insert the print ticket for the page is not an interface for inserting a print ticket only including a setting value corresponding to functions belonging to the page scope but an interface for inserting a print ticket including a plurality of setting values corresponding to functions belonging to each of the job scope, the document scope, and the page scope.

11. The non-transitory computer readable storage medium according to claim 8, wherein the first function includes at least any one of a function for adjusting a property of a printer engine, a finishing function, and a layout function.

12. The non-transitory computer readable storage medium according to claim 11, wherein the finishing function includes at least any one of a stapling function, a punching function, and a two-sided printing function.

13. The non-transitory computer readable storage medium according to claim 11, wherein the layout function includes an Nup function.

14. The non-transitory computer readable storage medium according to claim 8, wherein the control method further comprises:

skipping generation of a command for controlling printing according to setting values corresponding to a plurality of functions included in the print ticket for the page when the setting value corresponding to the first function included in the print ticket for the page is different from the stored setting value in the comparison, the setting value corresponding to the first function included in the print ticket for the page conflicts with the stored setting value, and the setting value corresponding to the first function included in the print ticket for the page is given a priority lower than the stored setting value.

15. An information processing apparatus comprising:
a memory storing instructions; and
a processor which is capable of executing the instructions causing the information processing apparatus to:
receive document data that has a layer structure and is able to contain a print ticket corresponding to each layer;
generate a first command for controlling printing according to a setting value included in a print ticket of a first layer contained in the received document data for a whole print job;
if there is a setting value corresponding to a first function belonging to a job scope or a document scope among setting values included in the print ticket of the first layer, store the setting value corresponding to the first function on a storage area;
generate page data that is to be included in a print job on a basis of the received document data;
when there is a print ticket of a second layer that is lower than the first layer and is to be set for a page when the page data is generated, compare a setting value corresponding to the first function included in the print ticket for the page with the stored setting value; and
when the compared setting values are different from each other, issue a control code for separation and generate a second command for controlling the printing according to setting values corresponding to a plurality of functions included in the print ticket for the page,
wherein, when the compared setting values are not different from each other, next page data based on the received document data is generated without issuing the control code.

* * * * *